United States Patent Office 3,238,181
Patented Mar. 1, 1966

3,238,181
HEAT RESISTANT POLYMERS CONTAINING RECURRING CYCLIC IMIDE GROUPS CONNECTED BY AMIDE OR ESTER LINKAGES
Bryce P. Anderson, Lafayette, Calif., assignor to De Soto Chemical Coatings, Inc., Chicago, Ill., a corporation of Delaware
No Drawing. Filed Nov. 3, 1960, Ser. No. 66,916
24 Claims. (Cl. 260—65)

My invention relates to coating compounds which are especially useful where resistance to high temperatures is especially desirable. More particularly, the improved coating materials contemplated by my invention will not flow, soften or char within the approximate range of 500° and 1000° F.

I have discovered certain organic polymeric compounds which at temperatures between about 500° and 1000° F. will not soften, flow or char and at temperatures above 1000° F. will ablate, that is to say, will pass directly from solid to gaseous state. This characteristic is highly desirable in certain applications of coating materials, as for instance, in the coating of ballistic missiles, which must retain their true ballistic properties in passing through the atmosphere.

The new and improved compounds contemplated by my invention comprise organic polymers which are N-substituted imides which have been linked together by ester linkages or amide linkages, or a combination thereof, and containing terminal reactive groups which can be utilized in the curing reaction, and may be classified as polyimide-polyesters or polyimide-polyamides, i.e., as polymers wherein the main chain comprises repetitive cyclic imide groupings and repetitive polyamide and/or polyester linkages.

According to my invention, I have evolved resin polymers resulting from the reaction of certain agents referred to herein as intermediates A, B and C, as defined hereinbelow. The cyclic imide groups are generally supplied by intermediates A and B, while the polyester and/or polyamide linkages are supplied by the reaction of intermediates A and B with intermediate C. Intermediates A and B may also in some cases supply some of the polyamide linkages.

The reaction product of intermediates A, B and C is a linear polyimide-polyester or polyimide-polyamide having reactive groups within the chain, and herein called the unfinished polymer. Upon final curing of the latter, with or without a cross-linking agent, cross-linking occurs to produce a resin of high-heat stability.

Intermediate A is a cyclic imide which is N-substituted by a radical having a reactive group at the end which is capable of producing an ester or amide linkage.

Intermediate B is a cyclic imide similar to A except that B contains additional reactive groups capable of forming an amide or ester linkage.

Intermediate C is a poly-functional compound having three or more reactive groups, at least two of which are capable of reacting with the reactive groups of intermediate A or B to form amide and/or ester linkages therewith to form the unfinished polymer. The additional reactive group or groups in intermediate C are available for cross-linking the unfinished polymer during the curing thereof.

Intermediate A is not an indispensable part of the reaction, being used merely to regulate the functionality or properties of the polymer resulting from the reaction.

By "regulating the functionality," I mean that intermediate A uses up reactive, or functional, groups which are on the polymer and not needed for chain extension, or desired for cross-linking purposes during the curing mechanism.

Since the presence of reactive groups on a polymer of this type greatly affects such properties as solubility, adhesion, flexibility, viscosity, etc., one could also say that intermediate A serves as a regulating mechanism for attaining the desired physical properties in the polymer, and also in the cured state, while maintaining the high heat resistance properties.

A polymer built of intermediates B and C alone would have all of the heat resistant properties of the A-B-C-B polymer, and could also have the same physical properties, if properly formulated. Intermediate A serves as a formulating aid, making the job easier. It is therefore desirable but not essential.

In the preparation of my new and improved coating compounds, I start, in accordance with the known art, with one or more anhydrides and an amine or amino compound, both as hereinafter particularized, capable of yielding an N-substituted imide containing a reactive group or groups for polymer formation.

A "reactive group," as the term is used herein, is an organic or inorganic group capable of reacting with another such group, either the same or different in constitution, to produce chain extension or cross-linking.

Illustrations of what are considered typical reactive groups are those characterizing the structure of carboxylic acids, acid halides, acid salts, sulfonic acids, aliphatic hydroxyls, aromatic hydroxyls, aldehydes, amides, amide halides, amidines, amines, isocyanates, isothiocyanates, thiolic acids, thionic acids, hydroxamic acids, imides, imide halides, thiamides, halogens, hydrazines, sulfides, thiols, oxirane, phosphoric acids, phosphinic acids, carbonic acids, nitriles, as well as vinyls, allyls, and alpha-beta carbonyl unsaturates.

Applicable to my invention in the formation of the main chain of the polymer are those of the N-substituted cyclic imides with reactive groups capable of forming ester or amide linkages, or a combination thereof, as noted above. Such groups constitute the amino, hydroxyl, and carboxyl groups. Other reactive groups may be utilized for the curing reaction.

As illustrations of anhydrides considered suitable for my purpose, I refer to phthalic anhydride, trimellitic anhydride, pyromellitic dianhydride (PMDA), maleic, succinic, tetrahydrophthalic, propionic, glycolic, glutaric, 4, 5 cyclohexenedicarboxylic, endomethylenetetrahydrophthalic, and isatoic anhydrides, hexahydromelletic trianhydride. Still others might be used. In general, polycarboxylic acids and anhydrides thereof capable of forming cyclic imides, as a class, may be employed in this relation, a cyclic imide being definable as (A)

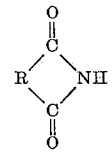

where R is a continuous aliphatic or aryl group comprising the constituents of the polycarboxylic acid used, which may also include additional reactive groups, as defined above. For the purposes of my invention the imido proton has been replaced by a variety of compounds to form N-substituted "cyclic" imides.

As to the amines or amino compounds employed with anhydrides, as noted above, I may employ a N-alcohol amine, such as ethanolamine, n-butanolamine, etc., or a di-primary amine compound such as ethylenediamine or 1,6-hexanediamine, or an amino acid, examples of which are glycine, β-alanine, γ-aminobutyric acid, δ-aminovaleric acid, ε-aminocaproic acid and the polypeptides of these simple amino acids such as glycylglycine and pentaglycylglycine. In general, amino acids may be employed wherein the reactive amino and carboxyl groups are terminal in position, i.e., attached to a carbon atom primary in nature.

Also usable would be compounds capable of yielding an amino acid which include basically the lactams and diketopiperazines, which two classes of compounds can produce the required amino acid in situ directly. The lactams are also known as "cyclic amides" while the diketopiperazines are often called "amino acid anhydrides."

Examples of lactams that could be used are γ-butyrolactam, δ-valerolactam, and ε-caprolactam. Diketopiperazine itself is an excellent example of the useful diketopiperazine types producing glycylglycine in acid solutions.

In general, the N-substituted imides desired in accordance with my invention, may be produced, for example, by reacting an anhydride of the structure (B) 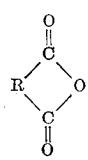

R being the same as in the above formula, with an amino acid, a lactam, a diketopiperazine, a N-alcohol amine or di-primary amine; by reacting a suitable diacid with an amino acid or a lactam, the resulting N-substituted imide being characterized by the presence of the group

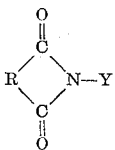

R being the same again and Y indicating the constituents of the amino acid, lactam, etc.

N-substituted imides of the type desired can also be produced by the preformation of the simple imide, illustration (A) above, by the reaction of the dicarboxylic acid anhydride with ammonia. The sodium or potassium salt of the simple imide is then formed, and treating this with the proper halogen-containing compound produces the substituted imide. This type of reaction was used by Gabriel in 1889 to produce an intermediate compound in his production of glycine from phthalimide. (See Gilman, "Organic Chemistry, An Advanced Treatise," vol. II; New York; John Wiley & Sons, Inc., 1943, p. 1105.)

The imide, as described above, according to my invention, is reacted with an aliphatic or aromatic compound terminating in at least three reactive groups, two of which must be appropriate reactive groups. By "appropriate" I mean such a group as will react with the terminal reactive group or groups of the N-substituted imide to produce the desired polymer.

The desired polymer, produced as stated above, will have the following general formula, the hydroxyls being employed for illustrative purposes as a possible reactive group useful for cross-linking purposes:

I 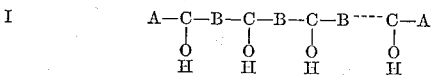

In this formula A represents an imide compound with one reactive group which will determine the total molecular weight of the finished product; B is an imide with two or more reactive groups but preferably two, and C is an aliphatic or aromatic compound terminating in three or more reactive groups. In the case where a secondary or tertiary alkyl structure is present as a part of the main or side chain, at least two of the reactive groups must be primary in nature, i.e., attached to a terminal carbon atom remote from the secondary or tertiary carbon atom of the chain and these primary reactive groups must be capable of reaction with the reactive groups on intermediate B to form ester or amide linkages. For example, in the type formula:

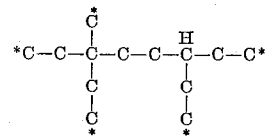

The asterisks indicate the possible positions where the primary reactive groups may be attached. In Formula I, it will be appreciated that the hydroxyl groups are recurring side reactive groups for cross linking. If compound C is a compound such as glycerine, for example, having two primary hydroxyl groups and one secondary hydroxyl group, the secondary hydroxyl group would be the recurring side reactive group and would be attached directly to the main polymer chain. If compound C is a compound such as trimethylolpropane wherein all the hydroxyl groups are primary, then the side reactive groups would be attached to the main chain through a methylene group.

It is customary in this art for curing to be effected in an oven or the like wherein the coated object is subjected to a certain elevated temperature for the required length of time. Such procedure would be impractical in the case of ballistic missiles or other very large objects, as contemplated in my invention. According to my invention, therefore, final curing is effected during actual service use when the required temperatures are encountered, such as after the firing of a missile, by normal elevation of the temperature in the course of passage of the coated object through the atmosphere.

However, a temporary or "convenience" curing is effected, according to my invention, by mere exposure to the air at normal temperatures within a period of a few hours, say from one or two hours to about forty-eight hours, after application of the coating material, as by spraying, to the surface. Such preliminary or "convenience" curing is accomplished by inclusion with the coating material or coating polymer of a suitable curing agent capable of reacting with the pendant reactive groups of the coating polymer. As examples of the latter, I might mention polyisocyanates, ureas, a chelating compound, an epoxy compound, etc., such materials and the technique of employment thereof being well known to those skilled in this art. The compound chosen for the convenience curing is so selected that it will escape by volatilization and without modification of the hardness or continuity of the film at the temperature of the final curing operation, say about 600° F. or above. By this means there is produced a smooth, non-softening transition between the preliminary cured condition and the final cured condition.

Convenience curing is a curing process of a temporary nature, effecting a cured polymeric mass to visual observation, and maintaining such cured polymeric mass until such time as the final curing conditions can be met, whereupon the agent used to effect this temporary cure will allow the final curing to take place.

An illustration of the convenience curing will be given in the examples below. In general, one would use amounts of reactants generally not exceeding stoichiometric ratios. The reactants would be selected so as to react with the reactive groups on the polymer at room temperature, or at low baking temperatures, effecting crosslinking, while having the ability to break their bonding at temperatures between 450 and 800° F., to allow final curing to proceed. The reactants would also be selected on the basis of producing a smooth transition from the temporary "convenience" cured state to the final cured state with a minimum of film softening during the transition.

The preferred agents to effect "convenience" curing are the polyisocyanates. Other possible curing agents are mentioned above.

While I am unable to state with certainty the precise structure of the finally cured material, I would postulate a structure essentially as follows where hydroxyl groups are used as the crosslinking reactive groups:

II

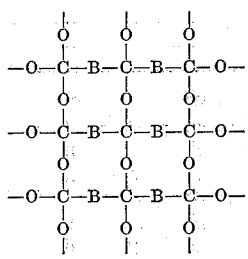

In the above structural formula, the characters B and C will have the same significance as in Formula I above.

A major reason, in my opinion, for the high stability of my improved coating materials under high temperatures lies in the presence of the imide group referred to above, which group will have the following general structure:

(C)

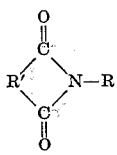

wherein "R" is an aliphatic chain terminating in a reactive group which is attached to a primary carbon atom, or an aliphatic chain containing a secondary or tertiary alkyl group as part of the main chain and wherein any reactive group present is attached to a terminal carbon atom which is primary in nature, i.e., remote from the secondary or tertiary carbon atoms of said aliphatic chain; and "R'" is aliphatic or aryl in nature and may contain reactive groups. If "R'" is aliphatic in nature the same conditions apply as to the "R" reactive groups. If "R'" is aryl in nature the reactive groups may be attached to the aryl grouping directly or attached to terminal carbon atoms, which are primary in nature, of an aliphatic chain which is attached to the aryl grouping.

Compounds wherein there is unsaturation which is of a vinyl, allyl, or alpha-beta unsaturate nature are useful only when the unsaturation is removed by hydrogenation or more preferably, by addition of a reactive proton-containing compound. Compounds especially useful for providing protons for such addition reactions are the amines, amino acids, thiols and lactams.

As an example of an intermediate of type A in Formula I above, utilizing one mole maleic anhydride (alpha-beta unsaturate) and two moles of ε-caprolactam, viz:

(D)

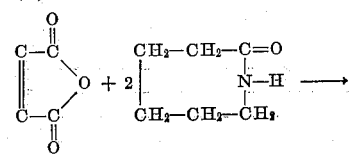

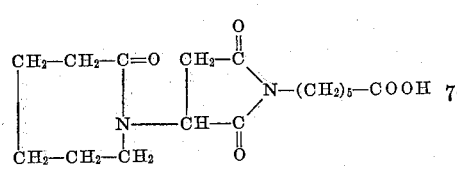

and as examples of intermediates of type B utilizing one mole of maleic anhydride, one mole of ε-aminocaproic acid, and one mole of ε-caprolactam (a) or utilizing one mole of maleic anhydride and two moles of ε-amino-caproic acid (b).

(E)
(a)

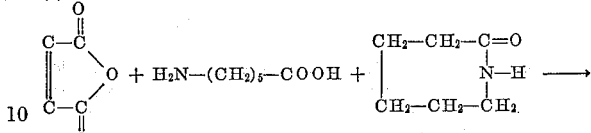

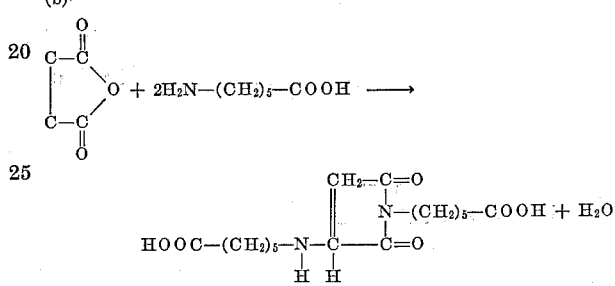

(b)

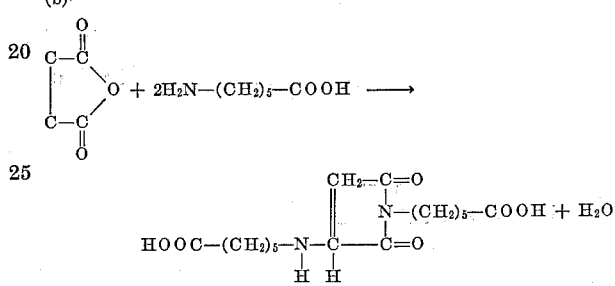

While I do not wish to be restricted to any particular theory, I believe the high resistance to elevated temperatures of the compounds contemplated by my invention may be explained as follows: As a basic principle explanatory, in general, of such high heat stability, I may state that the chemical structures contemplated by my invention possess a high degree of resonance stability. Such high resonance stability enables the compounds to withstand a high degree of thermal excitation which, in other organic compounds not so stabilized, would normally tend to produce a disruptive effect on the molecular structure. Such disruptive effect would be manifested chemically by cleavage of the carbon chains into small volatile units and free radicals, the physical effect being charring, softening and distillation of such volatile constituents, resulting in loss or destruction of the film.

Furthermore, the high degree of stability achieved pursuant to my invention is believed to be the result, essentially, of the ability of the fully covalent satisfied nitrogen atom of the imide group to share its two non-covalent electrons with electron-deficient fields. This results in electron-orbit structures which are more complete and fully satisfied. This principle is utilized in the structures contemplated by my invention wherein there is present an imide group and one or more groups comprising esters, amides and/or any other group containing atoms which may be satisfied by acceptance of such electrons.

The theory involved here will be clearly understood by those skilled in the art and familiar with basic resonance theory.

EXAMPLES, IN GENERAL

Before proceeding with specific examples illustrative of practical applications of my invention, the following considerations are presented as governing ranges of reactants in general.

It has been determined that the amino acid or amino acid producing component can vary from about one mole per mole of anhydride, or dicarboxylic acid combination capable of producing the cyclic imide as described above, to as many as six moles per mole of anhydride or diacid, while still maintaining high heat stability. However, as the molar ratio of amino acid or amino acid producing component to anhydride or diacid is increased, the ultimate usable temperature decreases and softening back becomes apparent at high temperatures. The high heat resistance of a polymer wherein the six molar ratio of ε-caprolactam to anhydride is used, as an example, lies generally in the 550 to 700° F. range.

An additional disadvantage to the use of high molar ratios of amino acid or amino-acid-producing component is the more critical solvency requirements of the polymer so formed due to the large number of peptide linkages present.

As the molar ratio exceeds 6, the polymeric product formed in the manner described assumes the characteristics of a wax rather than the characteristics of a resinous mass desirable for film formation.

As an example of an intermediate of type A containing a large number of peptide linkages due to a six molar ratio of ε-caprolactam to phthalic anhydride:

| | Parts by weight |
|---|---|
| 1 mole phthalic anhydride | 148 |
| 6 moles ε-caprolactam | 678 |

The cooking procedure is identical to that of Example I below.

The intermediate of type A so produced has the theoretical ideal formula:

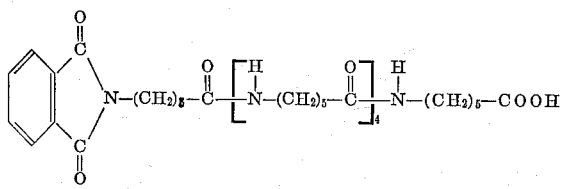

The molar ratio of di-primary-amine or n-alcohol amine to anhydride or diacid is always one, since multiple peptide or ester linkages are not possible through self-condensation reactions.

Reactants A, B and C, as defined above, may be present in the polymers embodying my invention in the following ranges, stated as mole-percent:

| | |
|---|---|
| Intermediate type A | 0–85 |
| Intermediate type B | 5–90 |
| Reactant type C | 10–90 |

The following is an example illustrative of a polymer within the range indicated above:

(G)

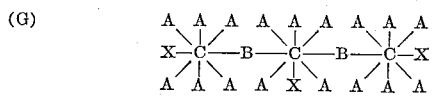

where X indicates a reactive group for crosslinking purposes.

In the above formula the constituents are present as

| | Percent |
|---|---|
| Mole percent A | 77.3 |
| Mole percent B | 9.1 |
| Mole percent C | 13.6 |

This polymer contains three reactive groups for crosslinking purposes. Such a polymer could be made using, as examples:

As intermediate A: succinic anhydride-ε-caprolactam
As intermediate B: trimellitic anhydride-ε-caprolactam
As reactant C: tripentaerythritol The following is an illustrative example omitting intermediate A:

(H)

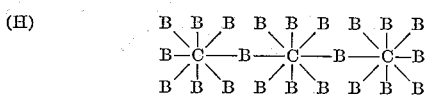

Here the constituents are in the following proportions:

| | Percent |
|---|---|
| Mole percent A | 0.0 |
| Mole percent B | 88.0 |
| Mole percent C | 12.0 |

This polymer would contain twenty reactive groups for cross-linking and adhesion purposes. Such a polymer could be made using the same ingredients as in (G) above.

*Example I*

In this example I produce intermediates of types A and B. This material is stable for a long period of time and may be reacted at any subsequent time in combination with an intermediate of type C to produce a finished coating material:

| | Parts by weight |
|---|---|
| Trimellitic anhydride | 634 |
| ε-Caprolactam | 567 |
| Phthalic anhydride | 247 |

The above ingredients are charged into a reaction vessel equipped with stirring mechanism and means for providing an atmosphere of inert gas as well as temperature control. The temperature is raised to about 350° F. and held at this temperature for about 15–30 minutes. The material is cooled and we now have in admixture intermediates of types A and B described above. The reaction product of the phthalic anhydride and ε-caprolactam constitutes an intermediate of type A and the reaction product of the trimellitic anhydride and ε-caprolactam constitutes an intermediate of type B.

The formation of the intermediates outlined in this example may be represented as follows:

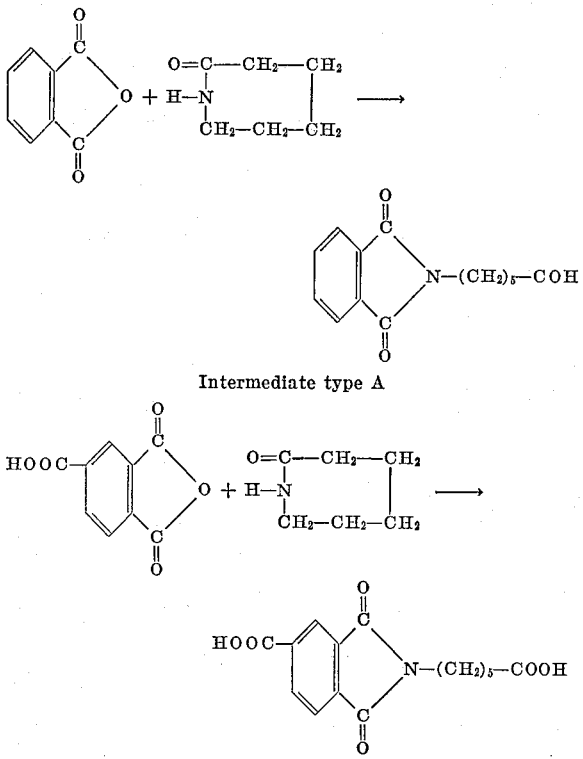

*Example II*

| | Parts by weight |
|---|---|
| Xylol | 60 |
| Trimellitic anhydride | 380 |
| ε-Caprolactam | 339 |
| Trimethylolpropane | 335 |
| Phthalic anhydride | 148 |

The above ingredients are placed in a reaction vessel of the type described above. The temperature is raised to approximately 300° F. at which point an inert gas sparge is introduced. The temperature is then raised over a period of 1½ hours to about 450° F. and held for an acid value less than 15. The polymer so produced is then thinned with an appropriate solvent, such as xylol, etc., or solvent mixture, in a manner familiar to those skilled in the art.

The complete reaction described in the above example may be represented as follows:

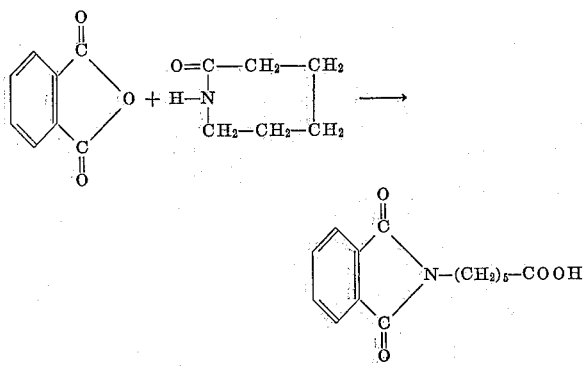

Intermediate type A

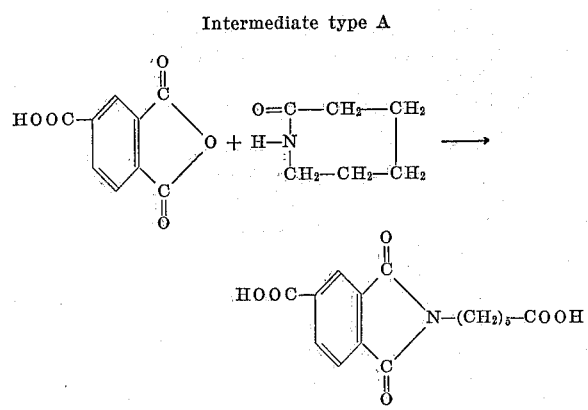

Intermediate type B

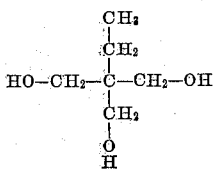

Intermediate type C

2A + 2B + 3C ⟶

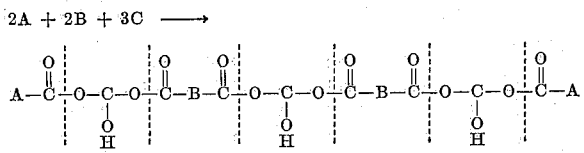

The above procedure results in the formation of the finished polymer suitable for direct application, as by spraying or any other suitable method familiar to those skilled in the art. It will be understood, of course, that before applying the material to the surface, there may be incorporated therein a suitable curing agent of the "convenience" type as described above, such as a polyisocyanate, in a noncritical amount, if convenience curing is indicated by the use, ordinarily not exceeding the stoichiometric ratio.

*Example II-a*

Other convenient methods of producing the finished coating material may be first to produce intermediates of types A and B, either together as in Example I or individually, as described above, and then to introduce into the reaction vessel containing intermediates A and B a material of intermediate type C, and then to proceed as indicated in Example II above. Such would constitute variations of Example II.

*Example III*

| | Parts by weight |
|---|---|
| Xylol | 30 |
| ε-Caprolactam | 245 |
| Pyromellitic dianhydride | 180 |
| Phthalic anhydride | 61 |
| Triphenyl phosphite | 2 |

The above ingredients are charged into a reaction vessel equipped with inert gas, stirring mechanisms, and temperature sensing and control devices. After introducing an inert gas blanket, the temperature is raised to a temperature sufficient to induce the desired imide formation, generally between 200 and 400° F., and held for approximately 15 to 45 minutes, until imidization is complete. The material is cooled and we now have in admixture intermediates of type A and B. There is then added 141 parts of trimethylolpropane and an inert gas sparge is introduced into the vessel. The temperature is then raised slowly to esterification temperatures and held to a desired acid value, generally between 5 and 25.

The product formed as described above constitutes a finished coating material of the type described in Example II above.

It might be noted here that the triphenyl phosphite included in this formula is merely for the purpose of maintaining a light color, a function well known in the art. This ingredient may be omitted where such color maintenance is not of importance. Furthermore, it may be noted that xylol is desirable but not essential, being included as an azeotropic solvent only.

The acid value is of importance in the compositions contemplated by my invention for enhancing firm adhesion of the coating material to a metal substrate. However, the presence of such acid value will accelerate darkening of the coating material at elevated temperatures and, in some instances, such deterioration of color is considered undesirable. In such instances, the acid value may be scavenged by incorporating in the mix, at the end of the operation described above, a stoichiometric quantity (which may be determined readily by those skilled in the art) of an acid scavenging material, such as an epoxy, an amine, etc. Such acid scavenging is well known to those skilled in the art.

As would be apparent to those skilled in the art, any of the finished polymers as described above, before application to a surface, would be thinned to the desired viscosity by addition of a suitable solvent, and need not be described here.

*Example IV*

In this example one would follow the same procedure as in Example II above except that one would double the portion of ε-caprolactam, resulting in the formation of an intermediate of type B having the following formula:

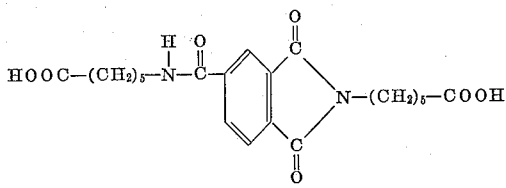

A coating produced from this intermediate would be similar to that of Example II above except that, in this case, the material would have higher flexibility and elasticity and different solubility characteristics. However, as in Example II and variations thereof, this product would likewise have high temperature resistance.

One could even further increase the percentage of amino acid-producing agent, such as ε-caprolactam, without departing from my invention.

Example V

Examples II, III and IV above might be varied in the following respects:

In lieu of the trimethylolpropane ingredient, one may substitute trimethylolethane or pentaerythritol, or various other compounds having a constitution corresponding to ingredient C, as defined above, employing stoichiometry. As illustrations of such other compounds, these could be the polyols, such as glycerine, triethanolamine, tributanolamine, dipentaerythritol, and tripentaerythritol, or they could be amine systems such as diethylenetriamine, tetraethylene-pentamine, benzenetriamine, triaminomethyl benzene, or 2-aminoethylpropanediamine, if the reactive group on intermediate B were carboxylic. Reactant C could also be the polycarboxylic acids, such as tricarballylic acid, trimellitic anhydride, pyromellitic dianhydride and their acids, if the reactive groups on intermediate B were hydroxyl or amine.

Example VI

| | Parts by weight |
|---|---|
| Xylol | 50 |
| Phthalic anhydride | 58 |
| Trimellitic anhydride | 150 |
| ε-Caprolactam | 664 |

The above would be cooked as in Example I above, and then the reactant of type C, such as 133 parts of pentaerythritol, is added, an inert gas sparge introduced, and the temperature raised slowly to esterification temperatures and held to the final A.V. desired. The molar ratio of caprolactam to anhydride here is 5.

Example VII 167 parts of succinic anhydride could be substituted in Example I above in place of the 247 parts of phthalic anhydride.

Example VIII

| | Parts by weight |
|---|---|
| Xylol | 50 |
| Trimellitic anhydride | 317 |
| Maleic anhydride | 82 |
| ε-Caprolactam | 379 |

The above ingredients are charged into a reaction vessel equipped with inert gas, stirring mechanisms, and temperature control. The temperature is raised to imidization temperature, generally about 350° F., and held for 30 to 45 minutes. The material is then cooled and 280 parts of Trimethylolpropane are added. An inert gas sparge is introduced and the temperature raised to esterification temperatures and held for the desired A.V., generally about 15. The polymer is then thinned with appropriate solvents such as xylol and methyl ethyl ketone.

This polymer utilizes the alpha-beta unsaturated compound maleic anhydride—in the manner described previously, wherein the unsaturation is removed by addition of the imido proton from an ε-caprolactam across the maleic double bond, Figure D.

Example IX

As an example of a type of convenience curing, to 470 grams solids of the polymer produced in Example VIII above, one could add 87 grams of tolylene diisocyanate or an isocyanate equivalent of an isocyanate adduct containing free isocyanate groups. Such a mixture would cure rapidly at room temperature or at a low baking temperature, producing a tight weather-resistant film until the final curing temperatures could be produced, such as the actual firing of a missile.

Example X

As an example of scavenging the residual acid value, as outlined above, one could take the polymer formed in Example III and upon obtaining the acid value of about 8, the temperature would be dropped to about 300 to 350° F. and 24 grams of glycidal butyl ether would be added. The temperature would then be raised over about 1 hour to 350–400° F. Additional increments of glycidal butyl ether may be used in the same manner, if some residual acid value remains.

It might be noted that in the finished polymers comprehended in my invention, intermediates of types A and B are in all cases bridged by a constituent corresponding to an intermediate of type C. This is a condition which is considered important from the standpoint of producing a polymeric material of heat-resistant character, according to my invention.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

If desired, pigments may be added to coating materials embodying my invention, in a manner readily apparent to those skilled in the art. Such pigments, of course, need not be heat-resistant, as loss of color in the atmosphere is not of prime importance. However, pigments of known heat-resistant properties may be used if desired.

I claim:

1. A method of preparing a polymeric coating composition which, upon being cured, is stable at high temperatures, comprising reacting a compound B with a compound C, compound B being an N-substituted imide having at least two reactive groups, one of which is linked onto the imido-N, compound C being a polyfunctional compound having at least three reactive groups, at least two of which are reactable with the reactive groups of the imide to produce linkages selected from the class consisting of esters and amides and the remainder of which reactive groups are selected from the class consisting of carboxylic acid, carboxylic acid halide, carboxylic acid salt, sulfonic acid, hydroxyl, aldehyde, amide, amide halide, amidine, amine, isocyanate, isothiocyanate, thiolic acid, thionic acid, hydroxamic acid, imide, imide halide, thiamide, halogen, hydrazine, sulfide, thiol, oxirane, phosphoric acid, phosphinic acid, carbonic acid, nitrile, vinyl, allyl, and alpha-beta carbonyl unsaturated groups, to produce said linkages to form a polymer having recurring residues of compounds B and C with said imide in the main chain joined by said linkages, said polymer having recurring side reactive groups for cross-linking the polymer upon subsequent treatment.

2. A method according to claim 1 wherein compound A is reacted with compounds B and C, compound A being present in an amount from zero mole percent up to a significant amount, compound A being an N-substituted imide having only one reactive group, said reactive group being linked onto the imido-N and being reactable with the reactive groups of compound C to form linkages from the class consisting of esters and amides, the amount of compound A controlling the chain length of the polymer.

3. A method according to claim 2, wherein said side reactive groups are constituted by the reactive groups of compound C which did not react with the reactive groups of compounds A and B.

4. A method according to claim 3, wherein the reactive group which is linked onto the imido-N is attached to a terminal carbon atom of an aliphatic radical substituted on the imido-N.

5. A method according to claim 4, wherein each of the other reactive groups of compounds A and B are independently selected from the class consisting of a reactive group attached to a terminal primary carbon atom of an aliphatic radical and a reactive group attached directly to an aryl ring.

6. A method according to claim 5, wherein said reactive groups are independently selected from the class consisting of amino, hydroxyl and carboxyl.

7. A method according to claim 6, wherein the reactants are present in the following ranges, as mole-percent:

Compound A _____ 0–85
Compound B _____ 5–90
Compound C _____ 10–90

8. A method according to claim 1, wherein the polymer is heated to a temperature sufficiently high to cross-link the polymer through said side reactive groups.

9. A method according to claim 1, wherein the polymer is reacted with a compound which reacts with the said reactive groups to cross-link the polymer.

10. A method according to claim 1, wherein the polymer is reacted with a polyisocyanate to cross-link the polymer through said side reactive groups and wherein the cross-linked polymer is heated to a temperature sufficiently high to eliminate the polyisocyanate residue to cross-link the polymer directly through said side reactive groups.

11. A method of preparing a polymer coating composition which, upon being cured is stable at high temperatures comprising reacting a compound B having the following formula:

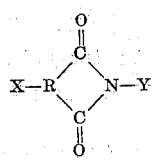

wherein R is an organic radical, X is a reactive group, and Y is an organic radical having a reactive group, each of said reactive groups being independently selected from the class consisting of amide and ester forming groups, with a compound C having the following formula:

wherein R' is in an organic radical, Z is a reactive group independently selected from the class consisting of amide and ester forming groups upon reaction with the reactive groups of compound B and Z' is a reactive group capable of being cross-linked and is selected from the class consisting of carboxylic acid, carboxylic acid halide, carboxylic acid salt, sulfonic acid, hydroxyl, aldehyde, amide, amide halide, amidine, amine, isocyanate, isothiocyanate, thiolic acid, thionic acid, hydroxamic acid, imide halide, thiamide, halogen, hydrazine, sulfide, thiol, oxirane, phosphoric acid, phosphinic acid, carbonic acid, nitrile, vinyl, allyl, and alpha-beta carbonyl unsaturated groups, to produce linkages selected from the group consisting of amide and ester linkages and form a polymer having recurring residues of compounds B and C joined by said linkages, said polymer having recurring side reactive groups Z' for cross-linking the polymer upon subsequent treatment.

12. A method according to claim 11, wherein compound A is reacted with compounds B and C, compound A being present in an amount from zero mole percent up to a significant amount, compound A having the structural formula as set forth for compound B, but without any reactive group being linked to R, the amount of compound A controlling the chain length of the polymer.

13. A method according to claim 12, wherein Y is an aliphatic radical having the reactive group attached to a terminal primary carbon atom and wherein R and R' are independently selected from the class consisting of aliphatic and aryl radicals, and X and Z are reactive groups independently selected from the class consisting of a reactive group attached to a terminal primary carbon atom of an aliphatic radical and a reactive group attached directly to an aryl ring.

14. A method according to claim 13 wherein each of the reactive groups is independently selected from the class consisting of hydroxyl, amino and carboxyl.

15. A method according to claim 14, wherein the polymer is further reacted to effect cross-linked through reactive groups Z'.

16. A method according to claim 15, wherein the polymer is cross-linked by reacting it with a polyisocyanate.

17. A polymer comprising recurring cyclic imide groups in the main chain connected by linkages selected from the class consisting of amide and ester linkages, said polymer having recurring side reactive groups for cross-linking the polymer said reactive groups being selected from the class consisting of carboxylic acid, carboxylic acid halide, carboxylic acid salt, sulfonic acid, hydroxyl, aldehyde, amide, amide halide, amidine, amine, isocyanate, isothiocyanate, thiolic acid, thionic acid, hydroxamic acid, imide, imide halide, thiamide, halogen, hydrazine, sulfide, thiol, oxirane, phosphoric acid, phosphinic acid, carbonic acid, nitrile, vinyl, allyl, and alpha-beta carbonyl unsaturated groups.

18. A polymer having the following structure

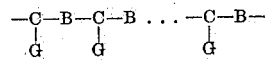

wherein B is an imide group, C is an organic group and G is a reactive group selected from the class consisting of carboxylic acid, carboxylic acid halide, carboxylic acid salt, sulfonic acid, hydroxyl, aldehyde, amide, amide halide, amidine, amine, isocyanate, isothiocyanate, thiolic acid, thionic acid, hydroxamic acid, imide, imide halide, thiamide, halogen, hydrazine, sulfide, thiol, oxirane, phosphoric acid, phosphinic acid, carbonic acid, nitrile, vinyl, allyl, and alpha-beta carbonyl unsaturated groups, C and B being interconnected by linkages selected from the class consisting of amide and ester linkages, G being a reactive group available for cross-linking the polymer.

19. A polymer according to claim 18, wherein C is selected from the group consisting of aliphatic and aryl groups and B has the structure

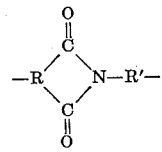

wherein R is selected from the class consisting of aliphatic and aryl groups and R' is an aliphatic group.

20. A polymer having the following structure

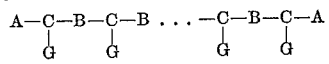

wherein A and C, and B and C, are interconnected by linkages selected from the class consisting of amide and ester linkages, C is an organic group, G is a reactive group available for cross-linking the polymer and is selected from the class consisting of carboxylic acid, carboxylic acid halide, carboxylic acid salt, sulfonic acid, hydroxyl, aldehyde, amide, amide halide, amidine, amine, isocyanate, isothiocyanate, thiolic acid, thionic acid, hydroxamine acid, imide, imide halide, thiamide, halogen, hydrazine, sulfide, thiol, oxirane, phosphoric acid, phosphinic acid, carbonic acid, nitrile, vinyl, allyl, and alpha-beta carbonyl unsaturated groups, B has the structure

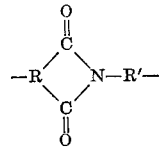

and A has the structure

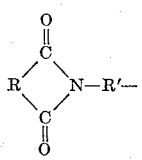

wherein R is a member independently selected from the class consisting of aliphatic and aryl radicals and R' is an aliphatic radical.

21. A polymer according to claim 20, in the cured state, wherein the polymer is cross-linked through reactive groups G.

22. A polymer according to claim 20, wherein G is selected from the class consisting of hydroxyl, amino and carboxyl.

23. A polymer having recurring cyclic imide groups in the main chain connected by linkages selected from the class consisting of amide and ester linkages, said polymer having recurring side reactive groups selected from the class consisting of amino, hydroxyl and carboxyl for cross-linking the polymer.

24. A method of preparing a polymeric coating composition which, upon being cured, is stable at high temperatures, comprising inter-reacting compounds A, B and C, compound A being an N-substituted imide having only one reactive group, said reactive group being linked onto the imido-N, compound B being an N-substituted imide having at least two reactive groups, one of which is linked onto the imido-N, compound C being a polyfunctional compound having at least three reactive groups, at least two of which are reactable with the reactive groups of compounds A and B to produce linkages selected from the class consisting of esters and amides, to produce said linkages to form a polymer having recurring residues of compounds B and C with said imide in the main chain joined by said linkages and having residues of compound A joined by said linkages, said polymer having recurring side reactive groups for cross-linking the polymer upon subsequent treatment, compound A being present in an amount from zero mole percent up to a significant amount, the amount of compound A controlling the chain length of the polymer, said reactive groups being selected from the class consisting of amino, hydroxyl and carboxyl.

References Cited by the Examiner
UNITED STATES PATENTS

| | | | |
|---|---|---|---|
| 2,241,321 | 5/1941 | Schlack | 260—78 |
| 2,281,961 | 5/1942 | Ufer et al. | 260—78 |
| 2,463,977 | 3/1949 | Kropa | 260—78 |
| 2,502,576 | 4/1950 | Lincoln et al. | 260—78 |
| 2,594,145 | 4/1952 | Flory | 260—75 |
| 2,777,830 | 1/1957 | Shivers | 260—75 |
| 3,049,518 | 8/1962 | Stephens | 260—78 |

WILLIAM H. SHORT, *Primary Examiner.*

HAROLD BURSTEIN, JOSEPH R. LIBERMAN,
*Examiners.*

H. D. ANDERSON, *Assistant Examiner.*

UNITED STATES PATENT OFFICE
CERTIFICATE OF CORRECTION

Patent No. 3,238,181            March 1, 1966

Bryce P. Anderson

It is hereby certified that error appears in the above numbered patent requiring correction and that the said Letters Patent should read as corrected below.

Column 6, lines 25 to 29, the formula should appear as shown below instead of as in the patent:

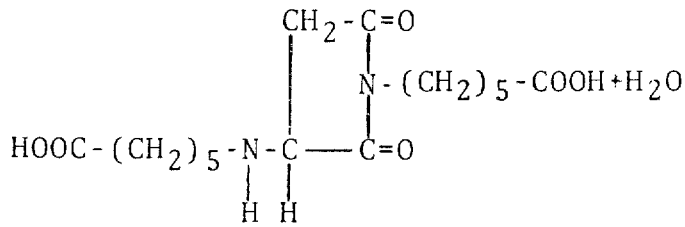

column 8, lines 36 to 42, for that portion of the formula reading "-COH" read -- -COOH --; column 10, line 47, for "adidtion" read -- addition --; column 13, line 49, after "acid," , third occurrence, insert -- imide, --; column 14, line 5, for "cross-linked" read -- cross-linking --; line 10, for "cycylic" read -- cyclic --.

Signed and sealed this 14th day of June 1966.

(SEAL)
Attest:

ERNEST W. SWIDER            EDWARD J. BRENNER
Attesting Officer            Commissioner of Patents